United States Patent
Ahmad et al.

(10) Patent No.: US 11,407,429 B2
(45) Date of Patent: Aug. 9, 2022

(54) ROAD RESOURCE CONFLICT RESOLUTION ALGORITHM

(71) Applicant: FORD GLOBAL TECHNOLOGIES, LLC, Dearborn, MI (US)

(72) Inventors: Syed Amaar Ahmad, Canton, MI (US); Azin Neishaboori, Plymouth, MI (US); John Walpuck, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 16/909,631

(22) Filed: Jun. 23, 2020

(65) Prior Publication Data

US 2021/0394792 A1 Dec. 23, 2021

(51) Int. Cl.
| | |
|---|---|
| *B60W 60/00* | (2020.01) |
| *H04W 4/46* | (2018.01) |
| *B60W 40/06* | (2012.01) |
| *G08G 1/16* | (2006.01) |
| *G08G 1/0967* | (2006.01) |

(52) U.S. Cl.
CPC ........ *B60W 60/0016* (2020.02); *B60W 40/06* (2013.01); *G08G 1/096791* (2013.01); *G08G 1/161* (2013.01); *H04W 4/46* (2018.02)

(58) Field of Classification Search
CPC .... B60W 60/0016; B60W 40/06; H04W 4/46; G08G 1/096791; G08G 1/161
See application file for complete search history.

(56) References Cited

U.S. PATENT DOCUMENTS

| | | | | |
|---|---|---|---|---|
| 6,154,688 | A | * | 11/2000 | Dominke ................ F02D 41/26 701/1 |
| 8,375,326 | B2 | | 2/2013 | Bucher et al. |
| 9,158,422 | B2 | | 10/2015 | Craig et al. |
| 10,318,078 | B2 | | 6/2019 | Okuzumi et al. |
| 10,684,626 | B1 | * | 6/2020 | Martin ................ G06K 9/6288 |
| 10,999,719 | B1 | * | 5/2021 | Kaplan .................. G06F 16/29 |
| 11,017,661 | B1 | * | 5/2021 | Beauchamp ............ H04W 4/44 |
| 11,148,007 | B2 | * | 10/2021 | Williams ............ A63B 71/0622 |
| 2005/0128103 | A1 | * | 6/2005 | Bachelder .............. G08G 1/087 340/906 |
| 2010/0134320 | A1 | * | 6/2010 | Chevion ................ G08G 1/164 340/932 |
| 2013/0116915 | A1 | * | 5/2013 | Ferreira .................. G08G 1/00 701/117 |

(Continued)

*Primary Examiner* — Peter D Nolan
*Assistant Examiner* — Wae L Louie
(74) *Attorney, Agent, or Firm* — Michael J. Spenner; Brooks Kushman P.C.

(57) ABSTRACT

A road resource is identified, according to one or more maneuver sharing intent messages received to the vehicle via a transceiver of a vehicle, where the road resource is contested between the vehicle and one or more other vehicles and includes a portion of a roadway to be traversed by the vehicle and also the one or more other vehicles. A conflict resolution procedure is performed to determine whether the vehicle gains access to the road resource, wherein the conflict resolution procedure is independently performed by each of the vehicle and the one or more other vehicles. One of the vehicle or the one or more other vehicles is granted access to the road resource based on the conflict resolution procedure.

16 Claims, 9 Drawing Sheets

(56) References Cited

U.S. PATENT DOCUMENTS

| | | | |
|---|---|---|---|
| 2017/0249836 A1* | 8/2017 | Laur | G06F 7/582 |
| 2017/0336788 A1* | 11/2017 | Iagnemma | B60W 30/12 |
| 2018/0018027 A1 | 1/2018 | Kowalk | |
| 2018/0292834 A1* | 10/2018 | Kindo | B60W 30/00 |
| 2019/0171215 A1* | 6/2019 | Tatourian | G06V 40/113 |
| 2020/0193811 A1* | 6/2020 | Zagajac | G08G 1/163 |
| 2020/0193818 A1* | 6/2020 | Cross | G08G 1/087 |
| 2020/0202729 A1* | 6/2020 | Tam | G08G 5/0052 |
| 2020/0254875 A1* | 8/2020 | Strandberg | G06F 3/04847 |
| 2020/0382925 A1* | 12/2020 | Doig | G01S 5/0072 |
| 2020/0389761 A1* | 12/2020 | Rao | H04W 4/40 |
| 2021/0245758 A1* | 8/2021 | Ahmad | B60W 30/0956 |
| 2021/0281614 A1* | 9/2021 | Ahmad | H04L 51/063 |
| 2021/0357905 A1* | 11/2021 | Branscomb | G06Q 20/3224 |

* cited by examiner

ROAD RESOURCE CONFLICT RESOLUTION ALGORITHM

TECHNICAL FIELD

Aspects of the present disclosure generally relate to road resource conflict resolution.

BACKGROUND

V2X communication allows vehicles to exchange information with other vehicles, as well as with infrastructure, pedestrians, networks, and other devices. Vehicle-to-infrastructure (V2I) communication enables applications to facilitate and speed up communication or transactions between vehicles and infrastructure.

SUMMARY

In one or more illustrative examples, a vehicle for performing road resource conflict resolution includes a transceiver and a processor. The processor is programmed to identify, according to one or more maneuver sharing intent messages received to the vehicle via the transceiver, a road resource that is contested between the vehicle and one or more other vehicles, the road resource including a portion of a roadway to be traversed by the vehicle and also the one or more other vehicles, perform a conflict resolution procedure to determine whether the vehicle gains access to the road resource, wherein the conflict resolution procedure is independently performed by each of the vehicle and the one or more other vehicles, and grant one of the vehicle or the one or more other vehicles access to the road resource based on the conflict resolution procedure.

In one or more illustrative examples, a method for performing road resource conflict resolution, includes identifying, accordingly to one or more maneuver sharing intent messages received to the vehicle via a transceiver of a vehicle, a road resource that is contested between the vehicle and one or more other vehicles, the road resource including a portion of a roadway to be traversed by the vehicle and also the one or more other vehicles; performing a conflict resolution procedure to determine whether the vehicle gains access to the road resource, wherein the conflict resolution procedure is independently performed by each of the vehicle and the one or more other vehicles; granting one of the vehicle or the one or more other vehicles access to the road resource based on the conflict resolution procedure; directing the vehicle to utilize the road resource responsive to the conflict resolution procedure deeming the vehicle to have access to the road resource; and directing the vehicle not to utilize the road resource responsive to the conflict resolution procedure deeming another vehicle to have access to the road resource.

In one or more illustrative examples, a non-statutory computer-readable medium includes instructions that, when executed by a processor of a vehicle, cause the vehicle to perform operations including to identify, according to one or more maneuver sharing intent messages received to the vehicle via a transceiver of a vehicle, a road resource that is contested between the vehicle and one or more other vehicles, the road resource including a portion of a roadway to be traversed by the vehicle and also the one or more other vehicles, wherein the one or more maneuver sharing intent messages are broadcast by the one or more other vehicles, each of the one or more maneuver sharing intent messages including data with respect to the sender of the respective connected message, the data indicating a momentum of the sender, a priority of the sender, an urgency of the sender, an intended trajectory of the sender, and road resources required for use by the sender; perform a conflict resolution procedure to determine whether the vehicle gains access to the road resource, wherein the conflict resolution procedure is independently performed by each of the vehicle and the one or more other vehicles; grant one of the vehicle or the one or more other vehicles access to the road resource based on the conflict resolution procedure; direct the vehicle to utilize the road resource responsive to the conflict resolution procedure deeming the vehicle to have access to the road resource; and direct the vehicle not to utilize the road resource responsive to the conflict resolution procedure deeming another vehicle to have access to the road resource.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Maneuvers may be performed by traffic participants such as vehicles. These maneuvers may include (i) lane changes, (ii) entering intersections, (iii) using on/off ramps, (iv) continuing in straight lanes, and/or (iv) any general adjustment of vehicle orientation. The intent of a traffic participant to make the maneuver may be shared with other traffic participants potentially involved in the maneuver. Using V2X communication, a vehicle may broadcast a maneuver sharing intent message indicating that the vehicle requires use of a road resource.

A conflict arises when two or more traffic participants contend for a common road resource or multiple road resources that partially overlap. As described herein, a conflict resolution procedure may be utilized where each vehicle runs an identical decision-making algorithm, distributed to allow the vehicles to reach the same distributed decision whether or not to proceed with the maneuver. Specifically, in the described conflict resolution algorithm, a winner that will temporarily occupy a contended road space will be independently determined by the vehicles as part of negotiation. Negotiation among contending vehicles is conducted for acquiring the parameters necessary to run the independent decision-making algorithm at each vehicle.

Figure 1:
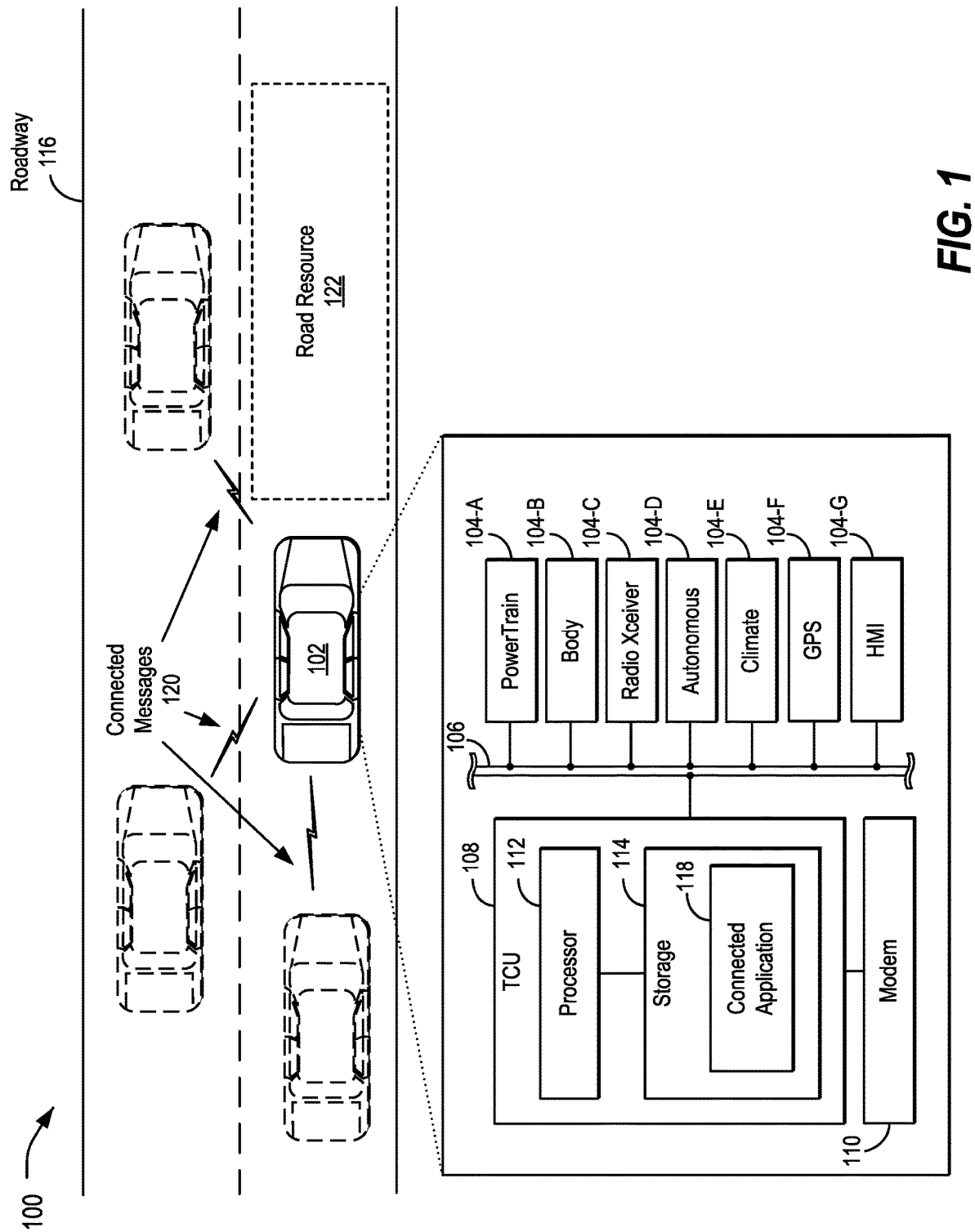
FIG. 1 illustrates an example system for the performance of road resource conflict resolution including vehicles traversing a roadway.

FIG. 1 illustrates an example system 100 for the performance of road resource conflict resolution including vehicles 102 traversing a roadway 116. The vehicle 102 may include various types of automobile, crossover utility vehicle (CUV), sport utility vehicle (SUV), truck, recreational vehicle (RV), boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). Alternatively, the vehicle 102 may be an Automated Vehicle (AV). The level of automation may vary between variant levels of Driver Assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs. It should be noted that while automotive vehicles 102 are being used as examples of traffic participants, other types of traffic participants may additionally or alternately be used, such as bicycles, scooters, and pedestrians, which may be equipped with V2X technology.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104-A through 104-G. However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an autonomous controller 104-D may be configured to provide commands to control the powertrain, steering, or other aspects of the vehicle 102; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The vehicle bus 106 may include various methods of communication available between the vehicle controllers 104, as well as between the TCU 108 and the vehicle controllers 104. As some non-limiting examples, the vehicle bus 106 may include one or more of a vehicle controller area network (CAN), an Ethernet network, and a media-oriented system transfer (MOST) network. Further aspects of the layout and number of vehicle buses 106 are discussed in further detail below.

The TCU 108 may include network hardware configured to facilitate communication between the vehicle controllers 104 and with other devices of the system 100. For example, the TCU 108 may include or otherwise access a cellular modem 110 configured to facilitate communication with other vehicles 102 or with infrastructure. The TCU 108 may, accordingly, be configured to communicate over various protocols, such as with a communication network over a network protocol (such as Uu). The TCU 108 may, additionally, be configured to communicate over a broadcast peer-to-peer protocol (such as PC5), to facilitate C-V2X communications with devices such as other vehicles 102. It should be noted that these protocols are merely examples, and different peer-to-peer and/or cellular technologies may be used.

The TCU 108 may include various types of computing apparatus in support of performance of the functions of the TCU 108 described herein. In an example, the TCU 108 may include one or more processors 112 configured to execute computer instructions, and a storage 114 medium on which the computer-executable instructions and/or data may be maintained. A computer-readable storage medium (also referred to as a processor-readable medium or storage 114) includes any non-transitory (e.g., tangible) medium that participates in providing data (e.g., instructions) that may be read by a computer (e.g., by the processor(s)). In general, the processor 112 receives instructions and/or data, e.g., from the storage 114, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc.

The TCU 108 may be configured to include one or more interfaces from which vehicle information may be sent and received. In an example, the TCU 108 may be configured to facilitate the collection of connected vehicle data and/or other vehicle information from the vehicle controllers 104 connected to the one or more vehicle buses 106. While only a single vehicle bus 106 is illustrated, it should be noted that in many examples, multiple vehicle buses 106 are included, with a subset of the controllers 104 connected to each vehicle bus 106. Accordingly, to access a given controller 104, the TCU 108 may be configured to maintain a mapping of which vehicle buses 106 are connected to which controllers 104, and to access the corresponding vehicle bus 106 for a controller 104 when communication with that particular controller 104 is desired.

The TCU 108 may be further configured to periodically transmit connected messages 120 for reception by other vehicles 102. For instance, the periodicity may be on the order of every ten milliseconds. The TCU 108 may be further configured to receive connected messages 120 from other vehicles 102. In an example, the management of sending and receiving of connected vehicle data may be handled by a connected application 118 executed by the TCU 108. The connected messages 120 may include collected information retrieved from the controllers 104 over the vehicle buses 106. In many examples, the collected information data may include information useful for autonomous vehicle operations or driver-assistance vehicle operations. The connected vehicle data information retrieved by the TCU 108 may include, as some non-limiting examples, latitude, longitude, time, heading angle, speed, lateral acceleration, longitudinal acceleration, yaw rate, throttle position, brake status, steering angle, headlight status, wiper status, external temperature, turn signal status, vehicle length, vehicle width, vehicle mass, and bumper height. The connected vehicle data information may also include, weather data (such as ambient temperature, ambient air pressure, etc.), traction control status, wiper status, or other vehicle status information (such as the status of exterior vehicle lights, type of vehicle, ABS system status, etc.). In one example, the connected messages 120 may take the form of BSM messages as described in the SAE J2735.

Vehicles traversing the roadway 116 may request use of road resources 122. As shown, an example road resource 122 is indicated as being in the forward travel path of the vehicle 102. More generally, each road resource 122 may be defined as a region in space and time that is to be occupied by a vehicle 102. The road resource 122 may accordingly have various characteristics, including shape characteristics, location characteristics, and temporal characteristics.

The shape characteristics may define the boundaries of the road resource 122. In one example, these boundaries may be of the form of a box type with a defined width, length, and height. In another examples, these boundaries may be of a spherical type with defined radius. It should be noted that these are merely examples, and the specific shape defined by the shape characteristics may vary from implementation to implementation or from road resource 122 to road resource 122 within the same implementation.

The location characteristics may define the location of the road resource 122 along the roadway 116. In an example, the shape of road resource 122 may be defined by its center, such as at a GNSS position (latitude, longitude, and elevation). In another example, the shape may be centered with lateral, longitudinal, and elevation displacement with respect to a current (BSM-based) position of the vehicle 102.

The temporal characteristics may define the timing during which the road resource 122 is required. In an example, the temporal characteristics may define a start time of when the road resource 122 may be occupied and an end time (or duration of time from the start time) when the road resource 122 must be vacated. These times may be defined with respect to current time. Current time may be reflected with respect to the BSMs, or in other examples with respect to other messaging between the vehicles 102 such as cellular communications.

While not shown, in some examples traffic participants may additionally involve communication via one or more roadside units (RSUs). The RSU may be a device with processing capabilities and networking capabilities, and may be designed to be placed in proximity of the roadway 116 for use in communicating with the vehicles 102. In an example, the RSU may include hardware configured to communicate over the broadcast peer-to-peer protocol (such as PC5), to facilitate C-V2X communications with the vehicles 102. The RSU may, accordingly, be able to communicate with multiple vehicles 102 along a specific roadway 116 or in a specific area. The RSU may also have wired or wireless backhaul capability to allow for communication with other elements of a traffic control system, via e.g., Ethernet, or cellular connection to the cellular network infrastructure, for example over Uu interface.

As described in further detail, using the connected application 118 the vehicles 102 may exchange information to coordinate maneuvers involving use by the vehicles 102 of the road resources 122. These maneuvers may include, as some examples, lane changes, lane merges, or intersection crossings. This messaging to coordinate the maneuvers may be done apart from the broadcast of BSMs.

Figure 2:
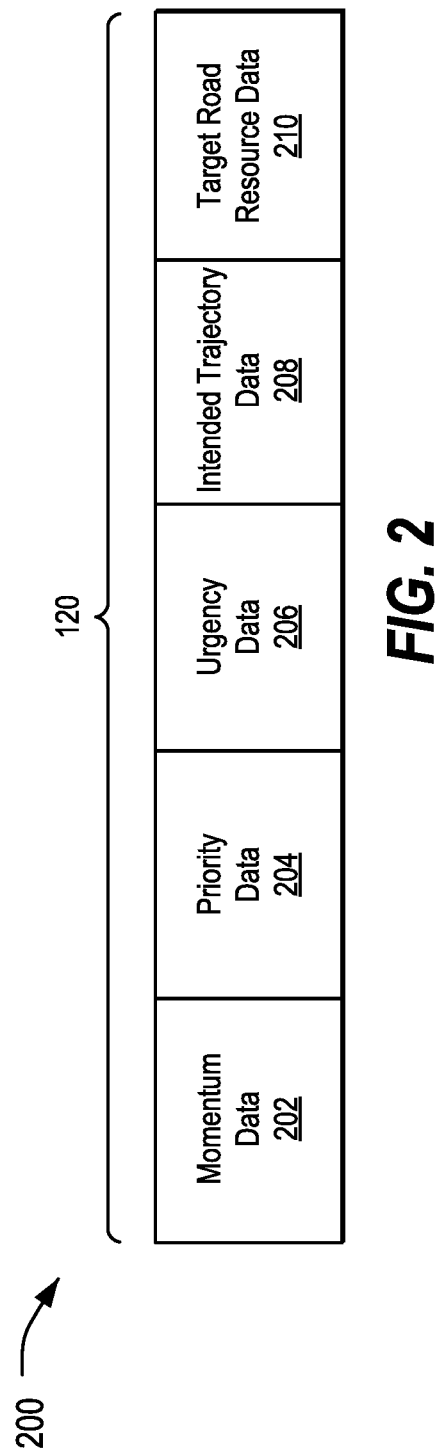
FIG. 2 illustrates an example detail of a connected message including information for use in road resource conflict resolution.

FIG. 2 illustrates an example detail 200 of a connected message 120 including information for use in road resource conflict resolution. To resolve a conflict of interest between multiple vehicles 102 relating to a common road resource, a vehicle 102 generates information to be exchanged as part of the maneuver sharing message handshaking with neighboring vehicles 102. As shown, this information includes vehicle momentum data 202, priority data 204, urgency data 206, intended trajectory data 208, and target road resource data 210. This information may be included in connected messages 120 to be sent to other vehicles 102. These messages may be referred to as maneuver sharing intent messages.

The dynamics of a vehicle 102, such as speed, turning rate (yaw), and acceleration along with its mass determine its vehicle momentum 202. When one vehicle 102 has a high amount of momentum, regardless of whether it is a sedan, an SUV, a truck, an ambulance, or a firetruck, it may be harder for that vehicle 102 to maneuver as compared with another. Hence, information with respect to the vehicle momentum 202 may be of primary value for assisting in determining a winner for access to a road resource 122. In situations in which the mass of the vehicle 102 is unavailable or unknown, then vehicle 102 volume (vehicle length×width× height) or area (length×width) may be used as proxy for mass to estimate the vehicle momentum 202 (e.g., using speed and turning rate).

The priority data 204 may indicate information with respect to relative priority of the vehicle 102. The priority data 204 may be based on various factors deemed relevant for the specific implementation of the road resource conflict resolution. In one example, the priority could relate to the type of the vehicle 102, e.g., whether the vehicle 102 is a sedan, SUV, truck, ambulance, or firetruck, for instance. In another example, emergency vehicles 102 may be assigned a higher priority value as compared to non-emergency vehicles 102. In an example, larger vehicles 102 may be assigned a higher priority value than smaller vehicles 102. In another example, vehicles 102 with more occupants may be assigned a higher priority than vehicles with fewer occupants.

The urgency data 206 may indicate information with respect to a quantitative determination of how soon the vehicle 102 will perform the maneuver. For instance, this quantitative measurement of urgency may include a distance and/or an estimated time before which the vehicle intends to perform the maneuver. The urgency data 206 may also include other optional information with respect to the circumstances of the maneuver, including an indication of a situation such as (i) a slow vehicle ahead, (ii) a ramp ahead, (iii) an exit to be taken ahead, (iv) road construction ahead, (v) a stopped vehicle ahead, (vi) debris/pothole ahead etc. A cause of the urgency, such as one or more of the enumerated examples (i)-(vi) above, may be incorporated into the urgency data 206.

The intended trajectory data 208 may indicate an intended trajectory of the vehicle 102. The intended trajectory refers to an anticipated path to be taken by a vehicle 102. As compared to the path history typically included within a BSM that relates to the past travel of the vehicle 102, the intended trajectory is an estimated path for the vehicle 102 in the future.

Aspects intended trajectory data 208 may vary based on the type of the roadway 116 being traversed by the vehicle 102. For instance, three different settings may be utilized according to whether the trajectory defines vehicle travel over: (i) a freeway, (ii) an urban environment, or (iii) an urban expressway. Different settings may be utilized due to differences in the driving requirements, an example of which is shown in Table 1:

TABLE 1

Example Trajectory Data Settings

| Environment | Sampling Size | Way Point Locations | Velocity | Acceleration | Heading | Time Horizon |
|---|---|---|---|---|---|---|
| Rural | S1 | $X_i, Y_i$ | $V_x, V_y$ | $A_x, A_y$ | $\theta$ | T1 |
| Urban | S2 > S1 | $X_i, Y_i$ | $V_x, V_y$ | $A_x, A_y$ | $\theta$ | T2 |
| Urban expressway | S3, such that: S2 < S3 ≤ S1 | $X_i, Y_i$ | $V_x, V_y$ | $A_x, A_y$ | $\theta$ | T3 |

It should be noted that the maximum index of i, herein N, may be determined as follows:

$$N = (1 + \text{floor}(\text{Time Horizon}/\text{Sampling Time}))$$

In one non-limiting specific example, S1 may be set to 5 milliseconds, S2 may be set to 10 milliseconds, S3 may be between 5 and 10 milliseconds, T1 may be set to 10 seconds, T2 may be set to 10 seconds, and T3 may be set to 10 seconds.

The type of the roadway 116 may be determined, for example, based on factors including one or more of the following: current speed limit, number of lanes of the roadway 116, number of vehicles 102 in the communication range of the host vehicle 102 (the host vehicle 102 being the vehicle 102 creating the connected messages 120 having information for use in road resource conflict resolution). There may also be default settings for the type of parameters, time horizon, and sampling time values if the type of roadway 116 cannot be determined. Or, if the type of roadway 116 cannot be determined a default roadway type may be used.

The roadway 116 may be segmented into discrete segments using a map. As one possibility, the map may include divisions of the roadway 116 into arbitrary tiles. Map matching may be performed based on the map to determine which in segment the host vehicle 102 (message sender) resides, as well as in which segments the targeted remote vehicles 102 (message recipients) reside. This matching may be performed according to GPS locations of the vehicles, in comparison to the geographic boundaries of the tiles of the map of the driving site and the database of routes. If map information is unavailable, then the intended trajectory of the vehicle 102 may be estimated according to vehicle 102 dynamics such as speed, yaw rate, acceleration, etc., albeit for a more limited time horizon (e.g., 2 seconds in one example).

The target road resource data 210 may include a set of road resources 122 that are to be traversed by the vehicle 102 in furtherance of pursuing its route. The set of road resources 122 may include an ordered set of the road resources 122 in the order that the vehicle 102 may request their use. In many examples, this set of the road resources 122 is contiguous in space and time, although overlap of the space and/or time of the road resources 122 may be permissible. In some examples, the route of the vehicle 102 may be specified as a plurality of trajectory way points along the roadway 116. In such an example, the target road resource data 210 may include the set of road resources 122 that overlap with the trajectory way points.

When a vehicle 102 makes a maneuver sharing request, the vehicle 102 is vying for a single road resource 122 or multiple contiguous road resources 122. A conflict may arise when two or more vehicles 102 contend for a common road resource 122 or road resources 122 that partially overlap.

For maneuver sharing between vehicles 102 involving human drivers, due to a lack of precision and uncertainty about driver response, the trajectory and the road resources 122 may overlap.

A conflict between vehicles 102 may be detected as an overlap or a crisscross of intended trajectories of the vehicles 102. Or, a conflict may be detected as an overlap of the target road resources 122.

Figure 3:
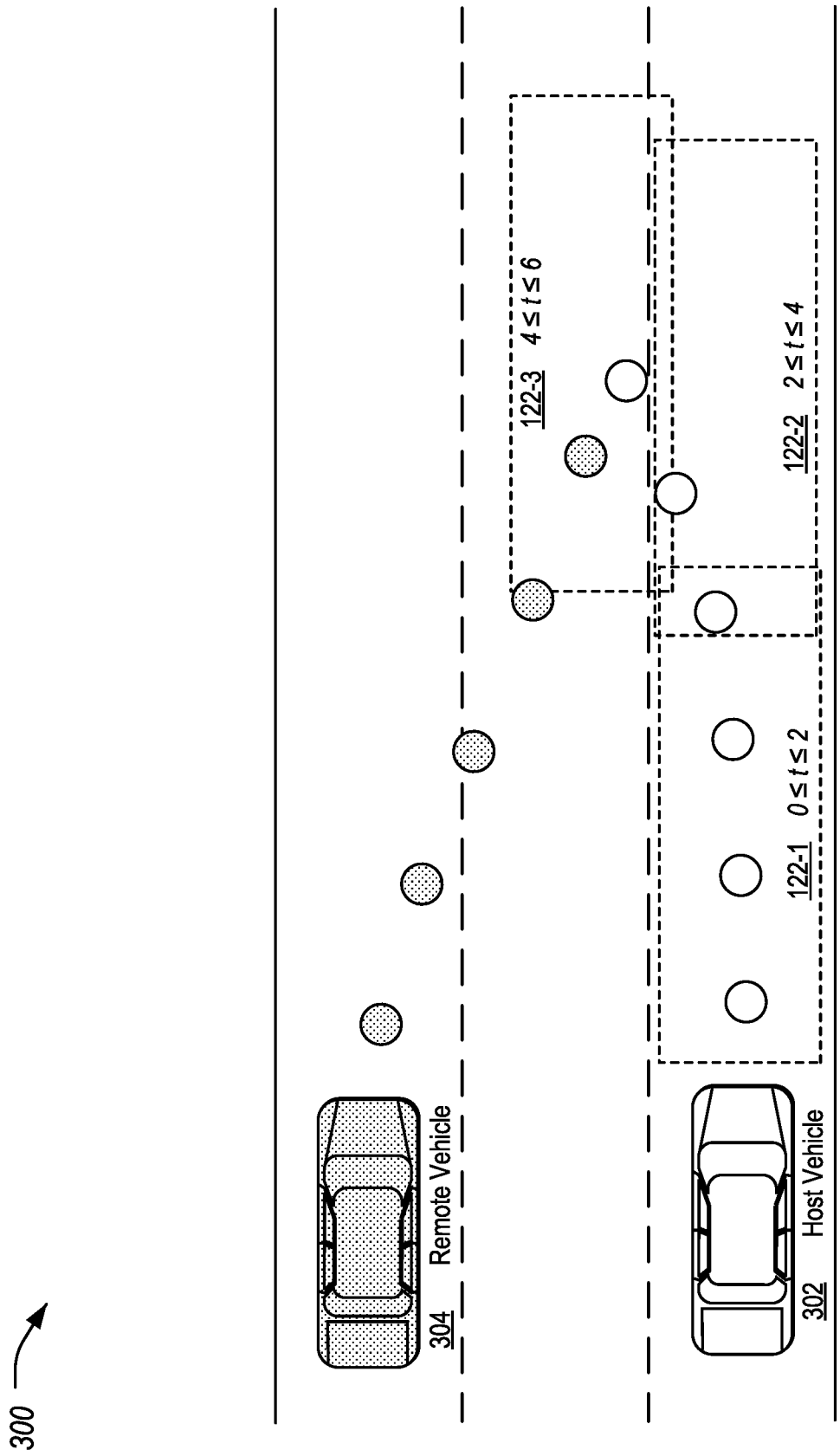
FIG. 3 illustrates an example of a maneuver of a lane change type.

FIG. 3 illustrates an example 300 of a maneuver of a lane change type. As shown, a host vehicle 302 is a vehicle 102 from who's perspective a situation may be discussed. Also as shown, a remote vehicle 304 is a vehicle 102 remote from the host vehicle 302 from the perspective of the host vehicle 302. Here, host vehicle 302 is traversing an anticipated trajectory indicated by a set of white markers. Additionally, a remote vehicle 304 is traversing an anticipated trajectory indicated by a set of shaded markers. More specifically, at time indices 0≤t≤2, the host vehicle 302 anticipates requiring use of road resource 122-1, at time indices 2≤t≤4, the host vehicle 302 anticipates requiring use of road resource 122-2, and at time indices 4≤t≤6, the host vehicle 302 anticipates requiring use of road resource 122-3. It can be seen that the anticipated trajectory of the remote vehicle 304 also may require use of the road resource 122-3.

Figure 4:
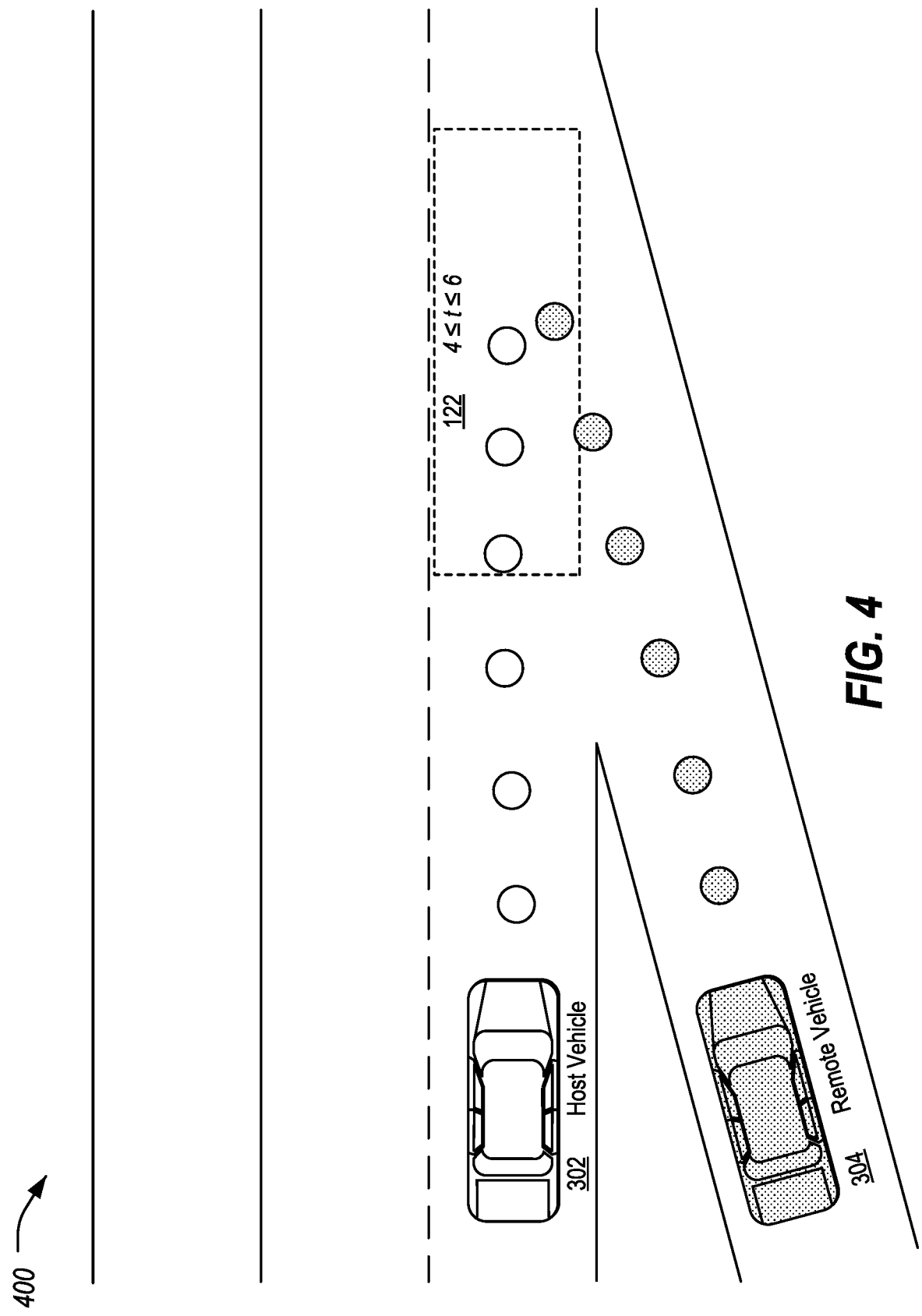
FIG. 4 illustrates an example of a maneuver of a lane merge type.

FIG. 4 illustrates an example 400 of a maneuver of a lane merge type. As shown again, a host vehicle 302 is traversing an anticipated trajectory indicated by a set of white markers, while a remote vehicle 304 is traversing an anticipated trajectory indicated by a set of shaded markers. At time indices $4 \leq t \leq 6$, the host vehicle 302 and the remote vehicle 304 each anticipate requiring use of road resource 122.

Figure 5:
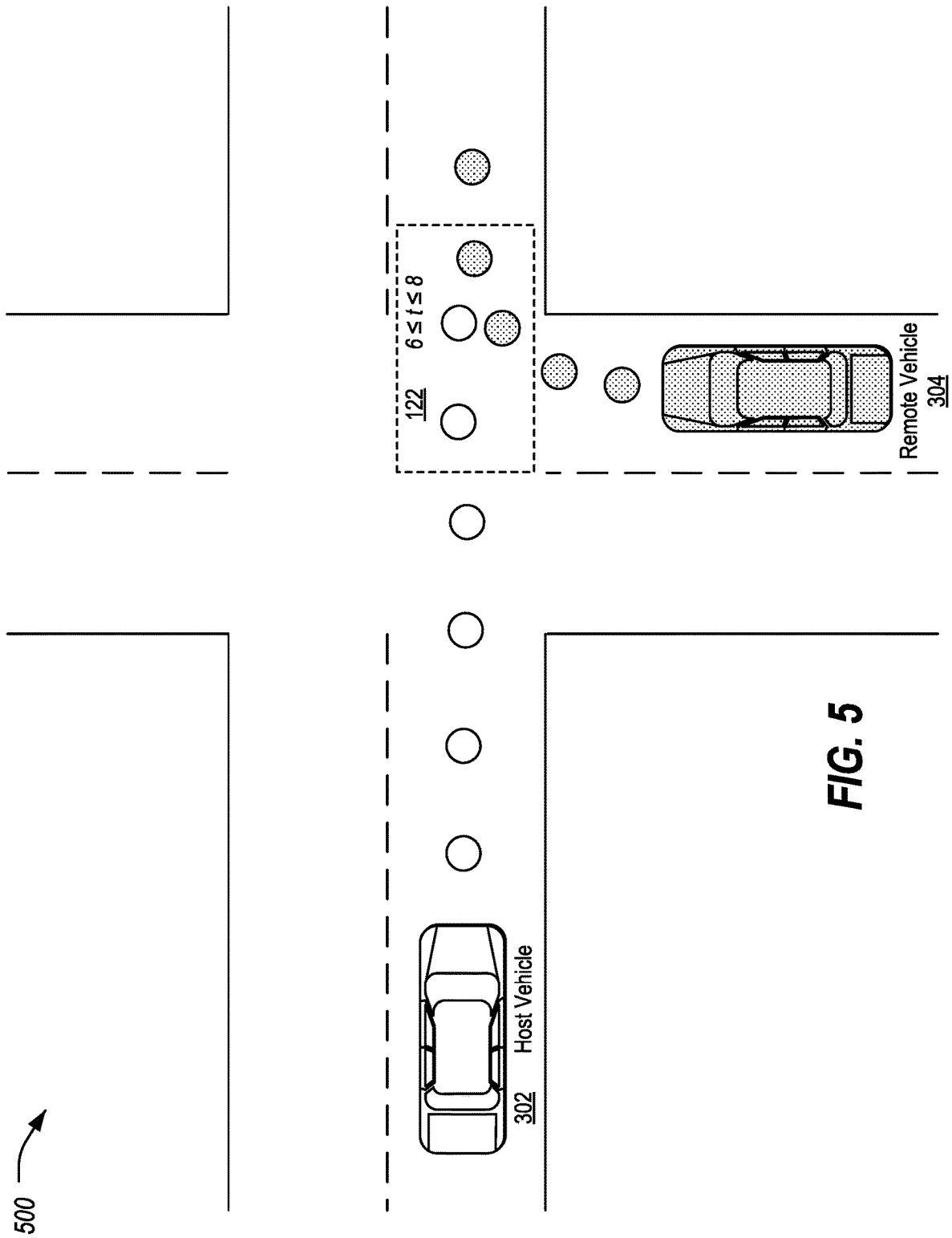
FIG. 5 illustrates an example of a maneuver of an intersection crossing type.

FIG. 5 illustrates an example 500 of a maneuver of an intersection crossing type. As shown again, a host vehicle 302 is traversing an anticipated trajectory indicated by a set of white markers, while a remote vehicle 304 is traversing an anticipated trajectory indicated by a set of shaded markers. At time indices $6 \leq t \leq 8$, the host vehicle 302 and the remote vehicle 304 each anticipate requiring use of road resource 122.

Thus, in each of these scenarios, the host vehicle 302 intends to occupy road resources 122 (e.g., a single road resource 122 in lane merge or intersection traversal but a set of road resources 122 for a lane change) for a given time intervals t (shown in seconds). The vehicle 302 accordingly has an anticipated trajectory shown as circles as way points for that path. Also in each scenario, a single remote vehicle (RV) 304 also contends for that road resource 122 with its own crossing trajectory.

Accordingly, a determination is to be made with respect to which of the vehicles 302 or 304 wins the contended road space for the requested time. This winner is allocated the road resource(s) 122. Note that there may be other factors that determine the winner besides urgency and priority. However, these factors may not need to be communicated and may be instead deduced by each individual vehicle 102 for itself. These factors may include one or more of: momentum, a randomly generated number as a tie breaker, an objective derived from speed, acceleration, weight, urgency, etc.

Figure 6:
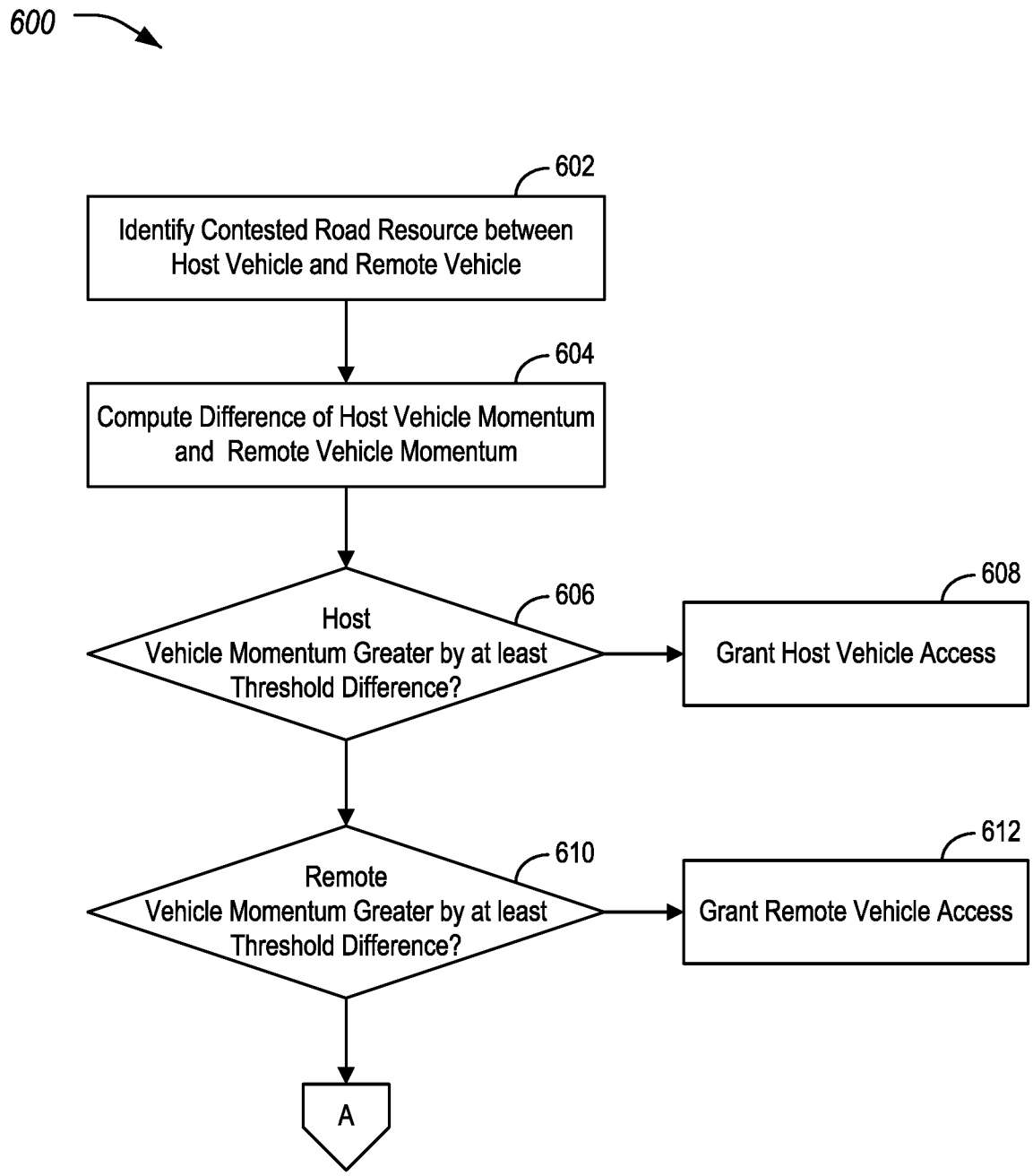
FIG. 6 illustrates an example aspect of a road resource conflict resolution process with respect to vehicle momentum.

FIG. 6 illustrates an example aspect 600 of a road resource conflict resolution process with respect to vehicle momentum. In an example, the aspect 600 may be utilized with respect to identifying a winner vehicle 102 for allocation of road resources 122. As described, the process is being performed by the host vehicle 302. However, it should be noted that the process is also being independently performed by any remote vehicles 304 also involved in a traffic situation.

At operation 602, the host vehicle 302 identifies a contested road resource 122 between the host vehicle 302 and a remote vehicle 304. In an example, the host vehicle 302 may receive connected messages 120 from the remote vehicle 304 including information for use in road resource conflict resolution. This information may include, as an example, vehicle momentum data 202, priority data 204, urgency data 206, intended trajectory data 208, and target road resource data 210. Based on the intended trajectory data 208 and/or road resource data 210, the host vehicle 302 may identify one or more road resources 122 that are required by both the host vehicle 302 and the remote vehicle 304.

At operation 604, the host vehicle 302 computes a difference between the momentum of the host vehicle 302 and the momentum of the remote vehicle 304. The information with respect to the momentum of the host vehicle 302 may be identified by the host vehicle 302 according to the dynamics of the vehicle 302, such as speed, turning rate (yaw), and acceleration along with its mass. The information with respect to the momentum of the remote vehicle 304 may be identified from the vehicle momentum data 202 included in the connected messages 120 received from the remote vehicle 304. The difference between these two values may be computed using a processor of the vehicle 302.

At operation 606, the host vehicle 302 determines whether the host vehicle 302 momentum exceeds the remote vehicle 304 momentum by at least a threshold level of momentum difference. In an example, the threshold level of momentum difference may be set empirically. If so, control passes to operation 608 to grant the host vehicle 302 access to the one or more road resources 122 that are required by both the host vehicle 302 and the remote vehicle 304. If not, at operation 610, the host vehicle 302 determines whether the remote vehicle 304 momentum exceeds the host vehicle 302 momentum by at least the threshold level of momentum difference. If so, control passes to operation 612 to grant the remote vehicle 304 access to the one or more road resources 122.

If, however, neither the host vehicle 302 nor the remote vehicle 304 exceeds the threshold level of momentum difference, then momentum beyond a threshold amount may not be a deciding factor on which of the vehicles 302, 304 should be granted access to the one or more road resources 122. If so, another aspect may be utilized to grant access to the one or more road resources 122.

Figure 7:
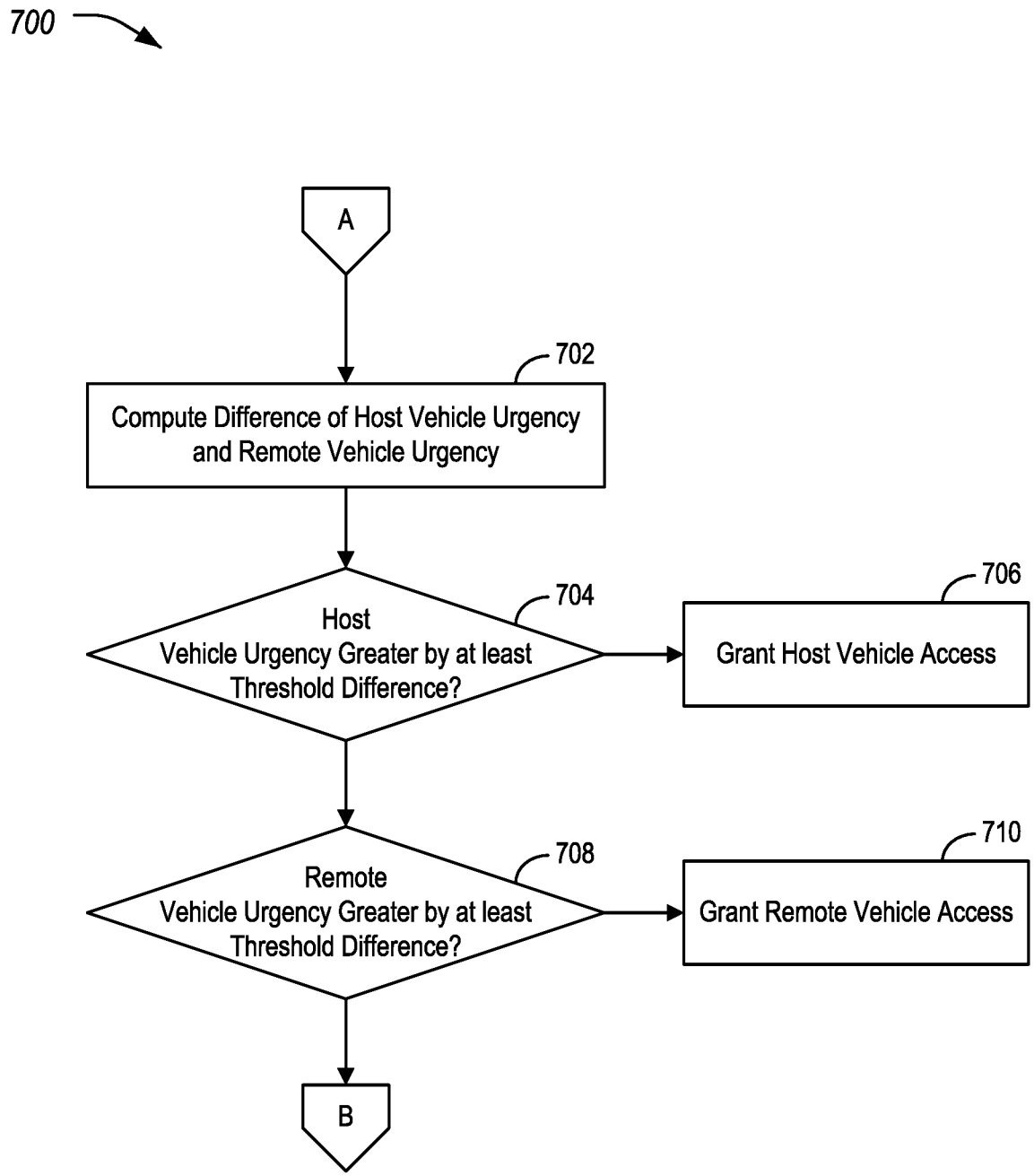
FIG. 7 illustrates an example aspect of a road resource conflict resolution process with respect to vehicle urgency.

FIG. 7 illustrates an example aspect 700 of a road resource conflict resolution process with respect to vehicle urgency. In an example, following from index (A) in the aspect 600 shown in FIG. 6, control may continue to attempt to utilize vehicle urgency as a deciding factor in the granting of access to the one or more road resources 122.

At operation 702, the host vehicle 302 computes a difference between the urgency of the host vehicle 302 and the urgency of the remote vehicle 304. The information with respect to the urgency of the host vehicle 302 may be identified by the host vehicle 302 according to a distance and/or an estimated time before which the vehicle intends to perform the maneuver. The urgency data 206 may also include other optional information with respect to the circumstances of the maneuver, as mentioned above. The information with respect to the urgency of the remote vehicle 304 may be identified from the urgency data 206 included in the connected messages 120 received from the remote vehicle 304. The difference between these two values may be computed using a processor of the vehicle 302.

At operation 704, the host vehicle 302 determines whether the host vehicle 302 urgency exceeds the remote vehicle 304 urgency by at least a threshold level of urgency difference. In an example, the threshold level of urgency difference may be set empirically. If so, control passes to operation 706 to grant the host vehicle 302 access to the one or more road resources 122 that are required by both the host vehicle 302 and the remote vehicle 304. If not, at operation 708, the host vehicle 302 determines whether the remote vehicle 304 urgency exceeds the host vehicle 302 urgency by at least the threshold level of urgency difference. If so, control passes to operation 710 to grant the remote vehicle 304 access to the one or more road resources 122.

If, however, neither the host vehicle 302 nor the remote vehicle 304 exceeds the threshold level of urgency difference, then urgency beyond a threshold amount may not be a deciding factor on which of the vehicles 302, 304 should be granted access to the one or more road resources 122. If so, another aspect may be utilized to grant access to the one or more road resources 122.

Figure 8:
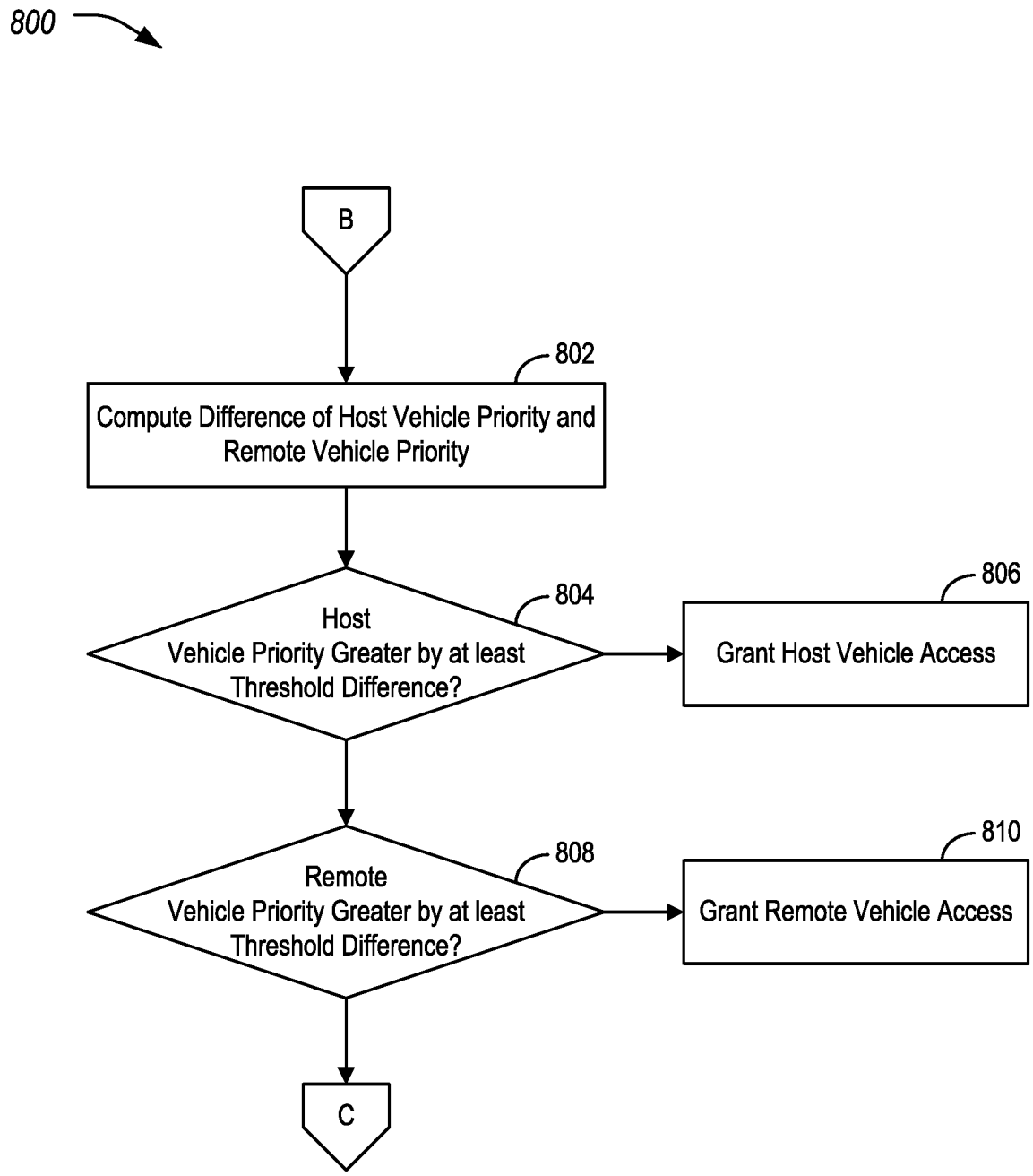
FIG. 8 illustrates an example aspect of a road resource conflict resolution process with respect to vehicle priority.

FIG. 8 illustrates an example aspect 800 of a road resource conflict resolution process with respect to vehicle priority. In an example, following from index (B) in the aspect 700 shown in FIG. 7, control may continue to attempt to utilize vehicle priority as a deciding factor in the granting of access to the one or more road resources 122.

At operation 802, the host vehicle 302 computes a difference between the priority of the host vehicle 302 and the priority of the remote vehicle 304. The information with respect to the priority of the host vehicle 302 may be identified by the host vehicle 302 according to various factors such as type of vehicle 102, whether or not the vehicle 102 is an emergency vehicle 102, size of vehicle 102, and/or number of occupants of the vehicle 102, as mentioned above. The information with respect to the priority of the remote vehicle 304 may be identified from the priority data 206 included in the connected messages 120 received from the remote vehicle 304. The difference between these two values may be computed using a processor of the vehicle 302.

At operation 804, the host vehicle 302 determines whether the host vehicle 302 priority exceeds the remote vehicle 304 priority by at least a threshold level of priority difference. In an example, the threshold level of priority difference may be set empirically. If so, control passes to operation 806 to grant the host vehicle 302 access to the one or more road resources 122 that are required by both the host vehicle 302 and the remote vehicle 304. If not, at operation 808, the host vehicle 302 determines whether the remote vehicle 304 priority exceeds the host vehicle 302 priority by at least the threshold level of priority difference. If so, control passes to operation 810 to grant the remote vehicle 304 access to the one or more road resources 122.

If, however, neither the host vehicle 302 nor the remote vehicle 304 exceeds the threshold level of priority difference, then priority beyond a threshold amount may not be a deciding factor on which of the vehicles 302, 304 should be granted access to the one or more road resources 122. If so, another aspect may be utilized to grant access to the one or more road resources 122.

Figure 9:
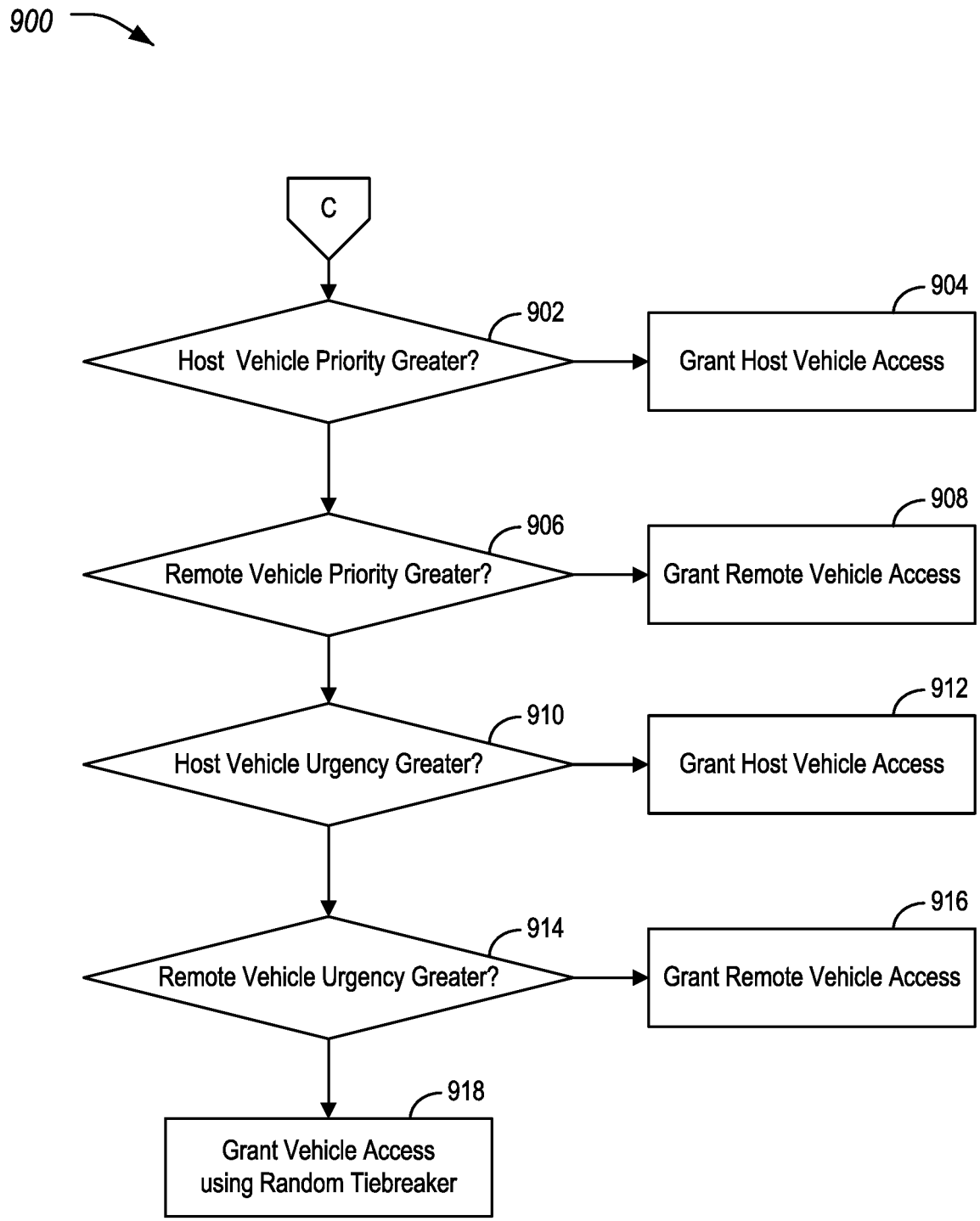
FIG. 9 illustrates an example aspect of a road resource conflict resolution process with respect to tiebreakers.

FIG. 9 illustrates an example aspect 900 of a road resource conflict resolution process with respect to tiebreakers. In an example, following from index (C) in the aspect 800 shown in FIG. 8, various other determinations may be made to attempt to determine a winner between the vehicle 302 and the vehicle 304 to use as a deciding factor in the granting of access to the one or more road resources 122.

As shown, at operation 902, the host vehicle 302 determines whether the vehicle priority of the host vehicle 302 is greater than the vehicle priority of the remote vehicle 304. Notably this determination is made without regard to the priority threshold. Thus, a determination here may involve a more subtle difference in priority between the host vehicle 302 and the remote vehicle 304 than used in the aspect 800. If the host vehicle 302 has greater priority, control passes to operation 904 to grant the host vehicle 302 access to the one or more road resources 122.

If not, control continues to operation 906 to determine whether the vehicle priority of the remote vehicle 304 is greater than the vehicle priority of the host vehicle 302. If so, control passes to operation 908 to grant the remote vehicle 304 access to the one or more road resources 122.

If the priorities between the host vehicle 302 and the remote vehicle 304 are identical as quantified, control passes to operation 910 to determine whether the host vehicle 302 urgency is greater than the urgency of the remote vehicle 304. As no urgency threshold is used, determination here may involve a more subtle difference in urgency between the host vehicle 302 and the remote vehicle 304 than used in the aspect 700. If the host vehicle 302 has greater urgency, control passes to operation 912 to grant the host vehicle 302 access to the one or more road resources 122.

If not, control continues to operation 914 to determine whether the vehicle urgency of the remote vehicle 304 is greater than the vehicle urgency of the host vehicle 302. If so, control passes to operation 916 to grant the remote vehicle 304 access to the one or more road resources 122.

If the urgencies between the host vehicle 302 and the remote vehicle 304 are identical as quantified, control passes to operation 918 to determine whether another tiebreaker between the host vehicle 302 and the remote vehicle 304 may be used to determine which vehicle 102 should gain access. As one example, a pseudorandom number may be generated by both the host vehicle 302 and the remote vehicle 304, seeded by the same initial value to produce identical results, where the pseudorandom number is used as a tiebreaker based on its value. The seed for the random number generation may be identical between the two vehicles 102 to come to the same outcome, where it may be based on a hash of the two vehicle's positions as mutually identified by the vehicle 102 itself and via the connected messages 120.

Thus, the aforementioned approach to road resource conflict resolution is guided by certain principles. If the momentum is too high for a vehicle 102, physics should dictate giving it the road resource 122 since changing the momentum may be difficult. Secondly, if the momenta are similar, then if the urgency is high for one vehicle 102 then that should be given precedence. Finally, if both the momenta and urgencies are similar then priority should be given precedence in assigning a winner. Variations on this approach are possible, however. For instance, a different ordering of the momentum, urgency, and/or priority may be used in making the determination.

As another variation, tuples including a plurality of factors (e.g., priority, urgency, momentum, random number, etc.) may be scored as combinations. This scoring may be performed for each host vehicle 302 and each conflicting remote vehicle 304, wherein the scoring is performed by a combining of the fields of the tuple into a score value for each vehicle 102. For example, the following example approach may be used:

$$Score = h1*priority + h2*urgency + h3*momentum + h4*randomNumber;$$

where h1, h2, h3, and h4 are weights for the tuple values consistently applies across the vehicles 102. As above, the seed for the random number generation may be identical between the two vehicles 102 to come to the same outcome, where it may be based on a hash of the two vehicle's positions as mutually identified by the vehicle 102 itself and via the connected messages 120. Using the score, the vehicle 102 with the highest score may be granted access to the one or more contested road resources 122.

It should also be noted that the described approaches to road resource conflict resolution may be used for situations involving more than two vehicles 102. For instance, when handling the conflict, each vehicle 102 can iteratively run the conflict resolution algorithm against all the other vehicles 102 to determine a final winner. Since all variables are known to all participants, only one vehicle 102 will be the winner, wither using the aforementioned nested algorithm or the tuple scoring algorithm to identify the vehicle 102 having the highest score.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle for performing road resource conflict resolution, comprising:
 a transceiver; and
 a processor of the vehicle, programmed to
  identify, according to one or more maneuver sharing intent messages received to the vehicle via the transceiver, a road resource that is contested between the vehicle and one or more other vehicles, the road resource including a portion of a roadway to be traversed by the vehicle and also the one or more other vehicles,
  perform a conflict resolution procedure to determine whether the vehicle gains access to the road resource, wherein the conflict resolution procedure is independently performed by each of the vehicle and the one or more other vehicles, and
  grant one of the vehicle or the one or more other vehicles access to the road resource based on the conflict resolution procedure;
 wherein the conflict resolution procedure includes to:
 if one of the vehicles has a momentum greater than a threshold momentum amount more than the other vehicles, grant that vehicle access to the road resource and deny other vehicles access to the road resource,
 if not, and if one of the vehicles has an urgency greater than a threshold urgency amount more than the other vehicles, grant that vehicle access to the road resource and deny other vehicles access to the road resource, and
 if not, and if one of the vehicles has a priority greater than a threshold priority amount more than the other vehicles, grant that vehicle access to the road resource and deny other vehicles access to the road resource.

2. The vehicle of claim 1, wherein the one or more maneuver sharing intent messages are broadcast by the one or more other vehicles, each of the one or more maneuver sharing intent messages including data with respect to a sender of the respective connected message, the data indicating a momentum of the sender, a priority of the sender, an urgency of the sender, an intended trajectory of the sender, and road resources required for use by the sender.

3. The vehicle of claim 2, wherein samples per unit time and a time horizon of the intended trajectory of the sender vary according to whether the vehicle is traversing a rural roadway, an urban roadway, or an urban expressway roadway.

4. The vehicle of claim 2, wherein:
the momentum is determined according to one or more of vehicle speed, vehicle yaw, vehicle acceleration, or vehicle mass;
the priority is determined according to one or more of a type of the vehicle, a size of the vehicle, or a quantity of passengers of the vehicle; and
the urgency is determined according to one or more of distance until the vehicle intends to perform a maneuver requiring the road resource, time until the vehicle intends to perform the maneuver requiring the road resource, or an indication of a situation requiring performance of the maneuver.

5. The vehicle of claim 4, wherein the situation includes one or more of: (i) a slow vehicle ahead, (ii) a ramp ahead, (iii) an exit to be taken ahead, (iv) road construction ahead, (v) a stopped vehicle ahead, or (vi) debris/pothole ahead.

6. The vehicle of claim 1, wherein the conflict resolution procedure further includes to:
if one of the vehicles has greater priority amount than the other vehicles, grant that vehicle access to the road resource and deny other vehicles access to the road resource;
if not, if one of the vehicles has greater urgency amount than the other vehicles, grant that vehicle access to the road resource and deny other vehicles access to the road resource; and
if not, grant access to one of the vehicles pseudorandomly using a seed determined according to positions of the vehicles.

7. The vehicle of claim 1, wherein the conflict resolution procedure includes to:
determine, for each of the other vehicles, a score based on a weighting of data included in one of the maneuver sharing intent messages corresponding to the other vehicle, the data being weighted including momentum of a sender of the one of the maneuver sharing intent messages, priority of the sender, and urgency of the sender;
determine, for the vehicle, a score based on data available to the vehicle, the data including momentum of the vehicle, priority of the vehicle, and urgency of the vehicle; and
grant the vehicle having the greatest score access to the road resource and deny other vehicles access to the road resource.

8. The vehicle of claim 1, wherein the processor is further programmed to:
direct the vehicle to utilize the road resource responsive to the conflict resolution procedure deeming the vehicle to have access to the road resource; and
direct the vehicle not to utilize the road resource responsive to the conflict resolution procedure deeming another vehicle to have access to the road resource.

9. A method for performing road resource conflict resolution, comprising:
identifying, according to one or more maneuver sharing intent messages received to a vehicle via a transceiver of the vehicle, a road resource that is contested between the vehicle and one or more other vehicles, the road resource including a portion of a roadway to be traversed by the vehicle and also the one or more other vehicles;
performing a conflict resolution procedure to determine whether the vehicle gains access to the road resource, wherein the conflict resolution procedure is independently performed by each of the vehicle and the one or more other vehicles;
granting one of the vehicle or the one or more other vehicles access to the road resource based on the conflict resolution procedure;
directing the vehicle to utilize the road resource responsive to the conflict resolution procedure deeming the vehicle to have access to the road resource; and
directing the vehicle not to utilize the road resource responsive to the conflict resolution procedure deeming another vehicle to have access to the road resource;
wherein the conflict resolution procedure includes to:
if one of the vehicles has a momentum greater than a threshold momentum amount more than the other vehicles, grant that vehicle access to the road resource and deny other vehicles access to the road resource,
if not, and if one of the vehicles has an urgency greater than a threshold urgency amount more than the other vehicles, grant that vehicle access to the road resource and deny other vehicles access to the road resource, and
if not, and if one of the vehicles has a priority greater than a threshold priority amount more than the other vehicles, grant that vehicle access to the road resource and deny other vehicles access to the road resource.

10. The method of claim 9, wherein the one or more maneuver sharing intent messages are broadcast by the one or more other vehicles, each of the one or more maneuver sharing intent messages including data with respect to a sender of the respective connected message, the data indicating a momentum of the sender, a priority of the sender, an urgency of the sender, an intended trajectory of the sender, and road resources required for use by the sender.

11. The method of claim 10, wherein samples per unit time and a time horizon of the intended trajectory of the sender vary according to whether the vehicle is traversing a rural roadway, an urban roadway, or an urban expressway roadway.

12. The method of claim 10, wherein:
the momentum is determined according to one or more of vehicle speed, vehicle yaw, vehicle acceleration, or vehicle mass;
the priority is determined according to one or more of a type of the vehicle, a size of the vehicle, or a quantity of passengers of the vehicle; and
the urgency is determined according to one or more of distance until the vehicle intends to perform a maneuver requiring the road resource, time until the vehicle intends to perform the maneuver requiring the road resource, or an indication of a situation requiring performance of the maneuver.

13. The method of claim 12, wherein the situation includes one or more of: (i) a slow vehicle ahead, (ii) a ramp ahead, (iii) an exit to be taken ahead, (iv) road construction ahead, (v) a stopped vehicle ahead, or (vi) debris/pothole ahead.

14. The method of claim 9, wherein the conflict resolution procedure further includes to:
    if one of the vehicles has greater priority amount than the other vehicles, grant that vehicle access to the road resource and deny other vehicles access to the road resource;
    if not, if one of the vehicles has greater urgency amount than the other vehicles, grant that vehicle access to the road resource and deny other vehicles access to the road resource; and
    if not, grant access to one of the vehicles pseudorandomly using a seed determined according to positions of the vehicles.

15. The method of claim 9, wherein the conflict resolution procedure includes to:
    determine, for each of the other vehicles, a score based on a weighting of data included in one of the maneuver sharing intent messages corresponding to the other vehicle, the data being weighted including momentum of a sender of the one of the maneuver sharing intent messages, priority of the sender, and urgency of the sender;
    determine, for the vehicle, a score based on data available to the vehicle, the data including momentum of the vehicle, priority of the vehicle, and urgency of the vehicle; and
    grant the vehicle having the greatest score access to the road resource and deny other vehicles access to the road resource.

16. A non-statutory computer-readable medium comprising instructions that, when executed by a processor of a vehicle, cause the vehicle to perform operations including to:
    identify, according to one or more maneuver sharing intent messages received to the vehicle via a transceiver of a vehicle, a road resource that is contested between the vehicle and one or more other vehicles, the road resource including a portion of a roadway to be traversed by the vehicle and also the one or more other vehicles, wherein the one or more maneuver sharing intent messages are broadcast by the one or more other vehicles, each of the one or more maneuver sharing intent messages including data with respect to a sender of the respective connected message, the data indicating a momentum of the sender, a priority of the sender, an urgency of the sender, an intended trajectory of the sender, and road resources required for use by the sender;
    perform a conflict resolution procedure to determine whether the vehicle gains access to the road resource, wherein the conflict resolution procedure is independently performed by each of the vehicle and the one or more other vehicles;
    grant one of the vehicle or the one or more other vehicles access to the road resource based on the conflict resolution procedure;
    direct the vehicle to utilize the road resource responsive to the conflict resolution procedure deeming the vehicle to have access to the road resource; and
    direct the vehicle not to utilize the road resource responsive to the conflict resolution procedure deeming another vehicle to have access to the road resource;
    wherein the conflict resolution procedure includes
    if one of the vehicles has a momentum greater than a threshold momentum amount more than the other vehicles, granting that vehicle access to the road resource and denying other vehicles access to the road resource;
    if not, and if one of the vehicles has an urgency greater than a threshold urgency amount more than the other vehicles, granting that vehicle access to the road resource and denying other vehicles access to the road resource;
    if not, and if one of the vehicles has a priority greater than a threshold priority amount more than the other vehicles, granting that vehicle access to the road resource and denying other vehicles access to the road resource;
    if one of the vehicles has greater priority amount than the other vehicles, granting that vehicle access to the road resource and deny other vehicles access to the road resource;
    if not, if one of the vehicles has greater urgency amount than the other vehicles, granting that vehicle access to the road resource and denying other vehicles access to the road resource; and
    if not, granting access to one of the vehicles pseudorandomly using a seed determined according to positions of the vehicles.

* * * * *